(12) United States Patent
Beckmann et al.

(10) Patent No.: US 6,890,680 B2
(45) Date of Patent: May 10, 2005

(54) MODIFIED DIFFUSION LAYER FOR USE IN A FUEL CELL SYSTEM

(75) Inventors: Gerhard Beckmann, Altamont, NY (US); Xiaoming Ren, Guilderland, NY (US); Paul F. Mutolo, Albany, NY (US); Frank W. Kovacs, Waterford, NY (US); Shimshon Gottesfeld, Niskayuna, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 267 days.

(21) Appl. No.: 10/078,728

(22) Filed: Feb. 19, 2002

(65) Prior Publication Data

US 2003/0157396 A1 Aug. 21, 2003

(51) Int. Cl.[7] .......................... H01M 4/96; H01M 8/10; H01M 4/88
(52) U.S. Cl. .............................. 429/44; 429/30; 429/33; 429/34; 429/42; 502/101
(58) Field of Search .............................. 429/30, 33, 34, 429/42, 44; 502/101

(56) References Cited

U.S. PATENT DOCUMENTS

| | | |
|---|---|---|
| 4,593,534 A | 6/1986 | Bloomfield |
| 4,673,624 A | 6/1987 | Hockaday |
| 4,810,597 A | 3/1989 | Kumagai et al. |
| 5,523,177 A | 6/1996 | Kosek et al. |
| 5,573,866 A | 11/1996 | Van Dine et al. |
| 5,599,638 A | 2/1997 | Surampudi et al. |
| 5,631,099 A | 5/1997 | Hockaday |
| 5,723,228 A | 3/1998 | Okamoto |
| 5,759,712 A | 6/1998 | Hockaday |
| 5,766,786 A | 6/1998 | Fleck et al. |
| 5,773,162 A | 6/1998 | Surampudi et al. |
| 5,795,668 A | 8/1998 | Banerjee |
| 5,916,699 A | 6/1999 | Thomas et al. |

(Continued)

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering.
"Polymer Electrolyte Fuel Cells as Potential Power Source for Portable Electronic Devices", Shinshon Gottesfeld and Mahlon S. Wilson, pp. 486–517.
Ren, Xiaoming, et al. Method Cross–Over in Direct Methanol fuel Cells, Electrochemical Society Proceedings vol. 95–23, Oct. 1995, pp. 284–293.

*Primary Examiner*—Hoa Van Le
(74) *Attorney, Agent, or Firm*—Cesari and McKenna, LLP; Rita M. Rooney, Esq.

(57) ABSTRACT

A fuel cell diffusion layer providing a preferential path by which liquid reactants or byproducts may be supplied to or removed from a direct oxidation fuel cell is described. The modified diffusion layer will be typically on the cathode side of the fuel cell and its use is to eliminate or minimize flooding of the cathode diffusion layer area, which is a performance limiting condition in direct methanol fuel cells. In accordance with one embodiment of the invention, the diffusion layer includes a substrate that is coated with a microporous layer. A pattern may be embossed into the diffusion layer, to create preferential flow paths by which water will travel and thereby be removed from the cathode catalyst area. This avoids cathode flooding and avoids build up of potentially destructive pressure by possible cathodic water accumulation. This also provides a means for collecting cathode water for redirection In accordance with another aspect of the invention, the preferential path is established by applying a thicker microporous layer to the carbon cloth or carbon paper and drying it in such a fashion so that when it dries, the surface of the microporous layer cracks to provide the pathways.

30 Claims, 4 Drawing Sheets

U.S. PATENT DOCUMENTS

| | | | |
|---|---|---|---|
| 5,945,231 A | * | 8/1999 | Narayanan et al. ............ 429/30 |
| 5,992,008 A | | 11/1999 | Kindler |
| 6,296,964 B1 | | 10/2001 | Ren et al. |
| 6,356,433 B1 | | 3/2002 | Shi et al. |
| 6,551,736 B1 | * | 4/2003 | Gurau et al. ................. 429/39 |
| 6,730,363 B1 | * | 5/2004 | Shah et al. .................. 427/508 |
| 2002/0036147 A1 | * | 3/2002 | Lehmann et al. ........... 205/343 |
| 2003/0059662 A1 | * | 3/2003 | Debe et al. ................... 429/34 |
| 2003/0170524 A1 | * | 9/2003 | Kordesch et al. ............. 429/34 |
| 2004/0197633 A1 | * | 10/2004 | Yamamoto et al. ........... 429/34 |

* cited by examiner

MODIFIED DIFFUSION LAYER FOR USE IN A FUEL CELL SYSTEM

BACKGROUND OF THE INVENTION

1. Field of the Invention

This invention relates generally to direct oxidation fuel cells, and more particularly, to diffusion layers for such fuel cells.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and requires significant volume, reformer based systems are presently limited to comparatively high power applications.

Direct oxidation fuel cell systems may be better suited for a number of applications in smaller mobile devices (e.g., mobile phones, handheld and laptop computers), as well as in some larger applications. Typically, in direct oxidation fuel cells, a carbonaceous liquid fuel in an aqueous solution (typically aqueous methanol) is applied to the anode face of a membrane electrode assembly (MEA). The MEA contains a protonically-conductive but, electronically non-conductive membrane (PCM). Typically, a catalyst which enables direct oxidation of the fuel on the anode is disposed on one surface of the PCM (or is otherwise present in the anode chamber of the fuel cell). Protons (from hydrogen found in the fuel and water molecules involved in the anodic reaction) are separated from the electrons. The protons migrate through the PCM, which is impermeable to the electrons. The electrons thus seek a different path to reunite with the protons and oxygen molecules involved in the cathodic reaction and travel through a load, providing electrical power.

One example of a direct oxidation fuel cell system is a direct methanol fuel cell system or DMFC system. In a DMFC system, methanol in an aqueous solution is used as fuel (the "fuel mixture"), and oxygen, preferably from ambient air, is used as the oxidizing agent. There are two fundamental reactions that occur in a DMFC which allow a DMFC system to provide electricity to power consuming devices: the anodic disassociation of the methanol and water fuel mixture into $CO_2$, protons, and electrons; and the cathodic combination of protons, electrons and oxygen into water. The overall reaction may be limited by the failure of either of these reactions to proceed to completion at an acceptable rate (more specifically, failure to oxidize the fuel mixture will limit the cathodic generation of water, and vice versa).

Typical DMFC systems include a fuel source, fluid and effluent management systems, and a direct methanol fuel cell ("fuel cell"). The fuel cell typically consists of a housing, and a membrane electrode assembly ("MEA") disposed within the housing. A typical MEA includes a centrally disposed protonically-conductive, electronically non-conductive membrane ("PCM"). One example of a commercially available PCM is Nafion® a registered trademark of E.I. Dupont Nemours and Company, a cation exchange membrane based on perflouorocarbon polymers with side chain termini of perflourosulfonic acid groups, in a variety of thicknesses and equivalent weight. The PCM is typically coated on each face with an electrocatalyst such as platinum, or platinum/ruthenium mixtures or alloy particles. On either face of the catalyst coated PCM, the electrode assembly typically includes a diffusion layer.

A conventional diffusion layer serves to evenly distribute liquids and gases across the electrodes. In the case of the anode, the diffusion layer is used to evenly distribute the fuel/water mixture to a maximum number of contact points on the surface of the anode so that the greatest surface area of the anode is utilized for methanol electro-oxidation. On the cathode side, the diffusion layer disperses oxygen so that it is more evenly introduced to the cathode face of the PCM to promote the oxygen electro-reduction, which produces water. In addition, flow field plates are often placed on the surface of the diffusion layers, but are not usually in direct contact with the coated PCM. The flow field plates function to provide mass transport of reactants and byproducts of the electro-chemical reactions, and the flow field plates may also have a current collection functionality, in that the flow field plates act to collect and conduct electrons to the load.

A typical diffusion layer may be fabricated of carbon paper or a carbon cloth, typically with a micro-porous coating made of a mixture of carbon powder and polytetrafluoroethylene (Teflon, also sometimes referred to herein as "PTFE"). The PTFE component has a function of wet proofing in the case of a gas-supplied electrode, but as the cell reaction proceeds, the carbon paper or carbon cloth can become saturated with liquid water. This can be caused by continuous water build-up in the cathode chamber of the fuel cell. The cathode can become "flooded", in which case the cathode half of the reaction can be compromised or even prevented. This results in the overall performance of the cell being compromised, or prevented.

Typically, the risk of cathode flooding is mitigated by active air flow to remove water from the cathode layer. This, however, increases the cost and complexity of the fuel cell system, thus adding to the expense of manufacture, as well as introducing the possibility of parasitic losses. In addition, it also adds volume to a system that must meet demanding form factors.

It is also noted that when water builds up in the cathode, it not only can cause flooding, which reduces the effectiveness of the half reaction on the cathode side, but it also results in pressure on the cathode face of the PCM that can weaken or compromise the bond between the membrane (PCM) and the catalytic coating, or the bond between the diffusion layer and the catalytic coating. Cell performance can be reduced over the long run because these stresses can ultimately cause separation of key fuel cell components, preventing the effective operation thereof.

There remains a need therefore for a diffusion layer that provides optimal gas diffusion properties, and resists flooding of the cathode portion of the fuel cell. In addition, in direct methanol fuel cells (DMFCs), the removal and collection of liquid water from the cathode by means of such a modified cathode diffusion layer is of high significance in maintaining overall water balance in the fuel cell system. Effective collection of liquid water at the cathode may be prerequisite to carrying just neat (pure) methanol, rather than methanol/water mixtures, as fuel supply to the DMFC.

It is thus an object of the invention to provide a diffusion layer that reduces the risk of cathode flooding, and liquid water-caused deterioration on the cathode side of the fuel cell and/or a cathode diffusion layer that allows liquid water to be collected for use in the direct methanol fuel cell system.

SUMMARY OF THE INVENTION

The present invention is a modified diffusion layer for use on the cathode face of a protonically conductive membrane of a DMFC, which is comprised of a diffusion material that has preferential flow paths incorporated therein which redirect and remove liquid across the diffusion layer and cause the liquid to preferentially flow, in a predetermined manner, usually away from the PCM. The inventive diffusion layer can thus provide a preferential path by which liquid reactants or byproducts may be removed. By providing a means by which fluids present on the cathode face of the fuel cell are removed without the use of pumps or other power consuming devices, the overall efficiency of the fuel cell is enhanced, and the operation of the cell is improved.

In accordance with the invention, the diffusion layer includes a substrate formed substantially of carbon, and is typically fabricated from carbon cloth or carbon paper. The substrate is coated with a hydrophobic microporous layer of Teflon and a high surface area of carbon particles on at least one side. An indentation pattern is formed to create channels, in accordance with the invention, into the microporous layer. The patterned channels provide paths by which fluids will preferentially travel in the fuel cell. In the case of the cathode, the preferential paths, or channels, direct the water to either a collection point away from the PCM where it may be purged to the ambient environment, or it may be recirculated to return it to the anode side of the cell.

In accordance with the method of the present invention, the modified diffusion layer can be fabricated by forming a substrate substantially of carbon, such as carbon paper or carbon cloth. The substrate is then treated by coating it with a microporous layer comprised of Teflon-coated high surface area carbon particles. This microporous layer is then embossed, using indentation techniques to form therein a pattern, thus, producing preferential flow paths, to direct the water, or other fluids, away from the membrane, and to remove them from the active area of the cell, as desired.

In accordance with yet a further aspect of the invention, the preferential path is established by applying a thicker wet mixture containing Teflon and high surface area carbon particles than is typically applied, to the carbon cloth or carbon paper. After drying and then sintering at the glass transition temperature of the Teflon, the face of the porous coating layer cracks, forming a mud-cracked pattern on the resulting microporous layer. These mud cracking patterns extend to the edges of the diffusion layer, providing a pathway for water to be transported away from the active electrode area.

In addition, materials may be selectively chosen for the microporous layer and other components in the cell, to encourage the flow of water (or other liquid byproducts and reactants) in certain predetermined directions within the cell, to further enhance performance of the cell.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
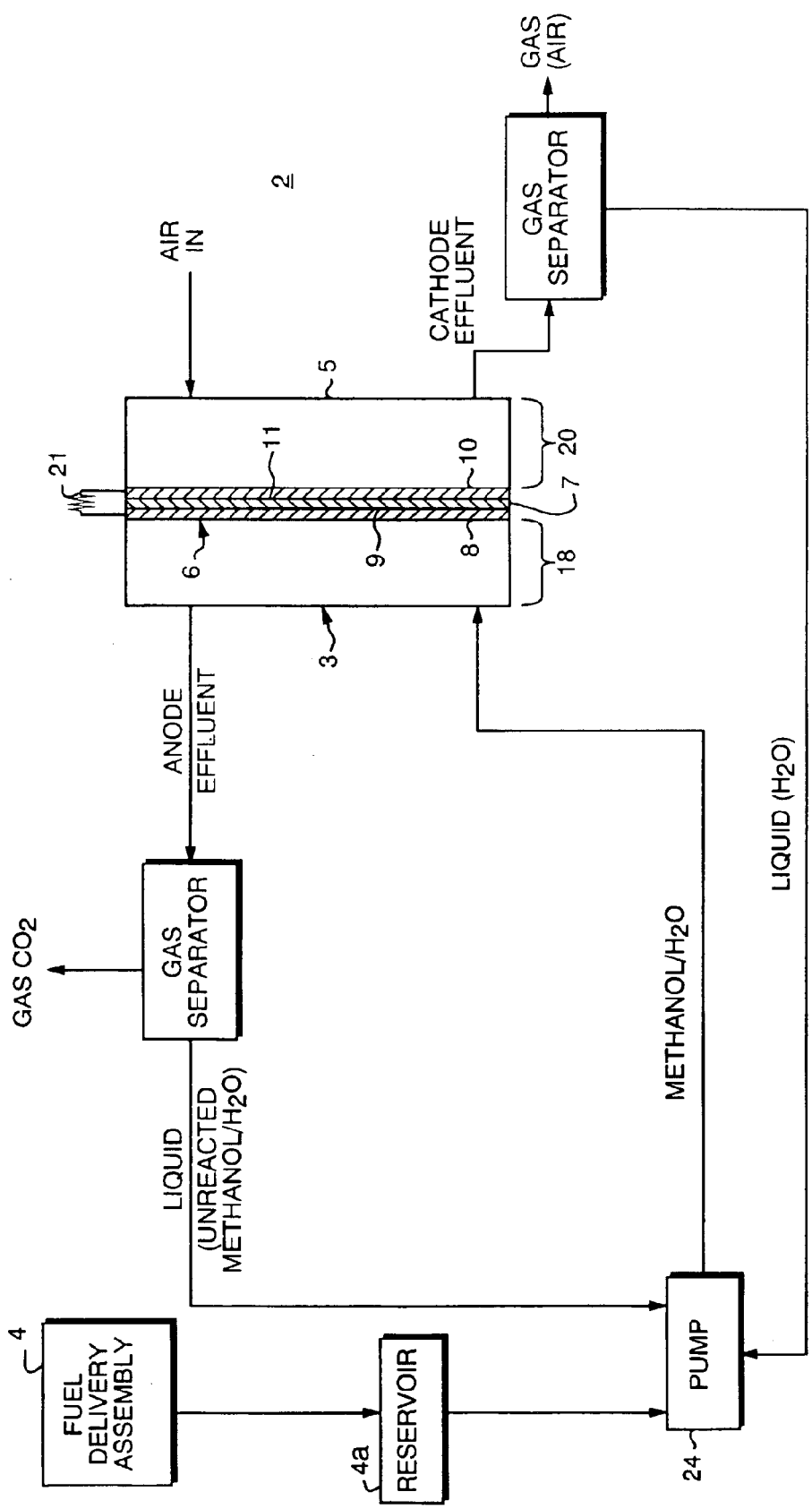
FIG. 1 is a block diagram of a direct oxidation fuel cell system with which the diffusion layer of the present invention may be employed.

For a better understanding of the invention, the components of a direct oxidation fuel cell system, a direct oxidation fuel cell and the basic operation of a fuel cell system, will be briefly described. One embodiment of a direct oxidation fuel system 2 is illustrated in FIG. 1, though the invention set forth herein may be used in a number of other system architectures. The fuel cell system 2 includes a direct oxidation fuel cell, which may be a direct methanol fuel cell 3 ("DMFC"), for example. For purposes of illustration we herein describe an illustrative embodiment of the invention with DMFC 3, with the fuel substance being methanol or an aqueous methanol solution. It should be understood, however, that it is within the scope of the present invention that other fuels may be used in an appropriate fuel cell. Thus, as used herein, the word "fuel" shall include methanol, ethanol, propane, butane or combinations thereof and aqueous solutions thereof, and other hydrocarbon fuels amenable to use in direct oxidation fuel cell systems.

The system 2, including the DMFC 3, has a fuel delivery system to deliver fuel from fuel source 4. An internal reservoir 4a may, but need not be, utilized in conjunction with the fuel source. Alternatively, a refillable internal reservoir may be used to store fuel. The DMFC 3 includes a housing 5 that encloses a membrane electrode assembly 6 (MEA). MEA 6 incorporates protonically conductive, electronically non-conductive membrane (PCM) 7, MEA 6 also incorporates an anode diffusion layer 8 and cathode diffusion layer 10, each of which may be coated with a catalyst, including but not limited to platinum, a blend of platinum and ruthenium, or other alloy with high surface area particles, which may be supported or unsupported by carbon particles. The portion of DMFC 3 defined by the housing 5 and the anode face of the PCM is referred to herein as the anode chamber 18. The portion of DMFC 3 defined by the housing 5 and the cathode face of the PCM is referred to herein as the cathode chamber 20.

As will be understood by those skilled in the art, a carbonaceous fuel in an aqueous solution (typically an aqueous methanol solution) passes from a fuel source 4, through the anode flow field plate (if any) after which it enters the anode diffusion layer 8 where it is dispersed and presented to the anode aspect of the PCM 7, in a substantially uniform fashion. Similarly, an oxidizing agent (or oxidant), preferably ambient air, is made available to the PCM 7, via the cathode diffusion layer 10, the details of which are described herein after in accordance with the present invention. Those skilled in the art will recognize that flow field plates (not shown) may be placed in contact with each aspect of the diffusion layers 8,10 that are not in contact with the PCM 7.

Catalysts on the PCM 7 (or are otherwise present in each of the anode and cathode chambers, 18 and 20 respectively) enable the oxidation of the carbonaceous fuel and water mixture on the anode face 9 of the PCM 7 forming carbon dioxide as the byproduct of the anodic reaction, and releasing protons and electrons from the hydrogen atoms in the fuel and water mixture. Upon the closing of an external circuit, the protons pass through the PCM 7, which is impermeable to the electrons. The electrons seek a different path to reunite with the protons and travel through a load and, thus, provide the electrical power from the fuel cell 3. The electrochemical reactions are as follows:

Anode: $CH_3OH+H_2O=CO_2+6H^++6e^-$     Equation 1

Cathode: $6H^++6e^-+3/2O_2=3H_2O$     Equation 2

Net Process: $CH_3OH+3/2O_2=CO_2+2H_2O$     Equation 3

As stated before, the second half of the reaction occurs in the cathode and it is described in the above Equation 2. More specifically, water is produced at the cathode face of the PCM. Under some operating conditions, so much water is created or passes through the PCM, that the catalyst diffusion layer 10 and/or the cathode catalyst layer can become flooded causing the DMFC to cease functioning.

Figure 2:
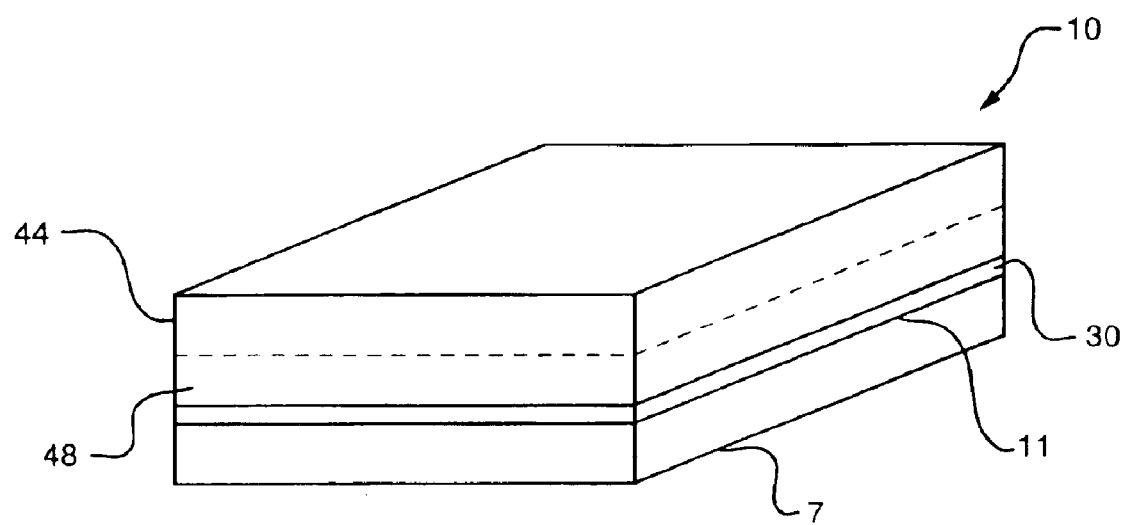
FIG. 2 is an isometric schematic drawing of a membrane electrode assembly with which the present invention may be employed.

Referring now to FIG. 2, the diffusion layer of the present invention, which provides a solution to this problem, will be described in detail. A protonically-conductive membrane PCM 7 has a cathode face 11, which is coated with a catalyst layer 30. A diffusion layer 10 is placed contiguous to the catalyst layer 30. The diffusion layer 10 is fabricated as a substrate 44 formed substantially of carbon, such as carbon cloth or carbon paper. A hydrophobic microporous layer comprised of Teflon-coated high surface area carbon particles is typically applied to the substrate 44, forming a microporous backing layer 48. The microporous backing layer 48 is in intimate contact with the catalyst coated membrane 7, in order to minimize resistance to the flow of electrons across the fuel cell.

Figure 3A:
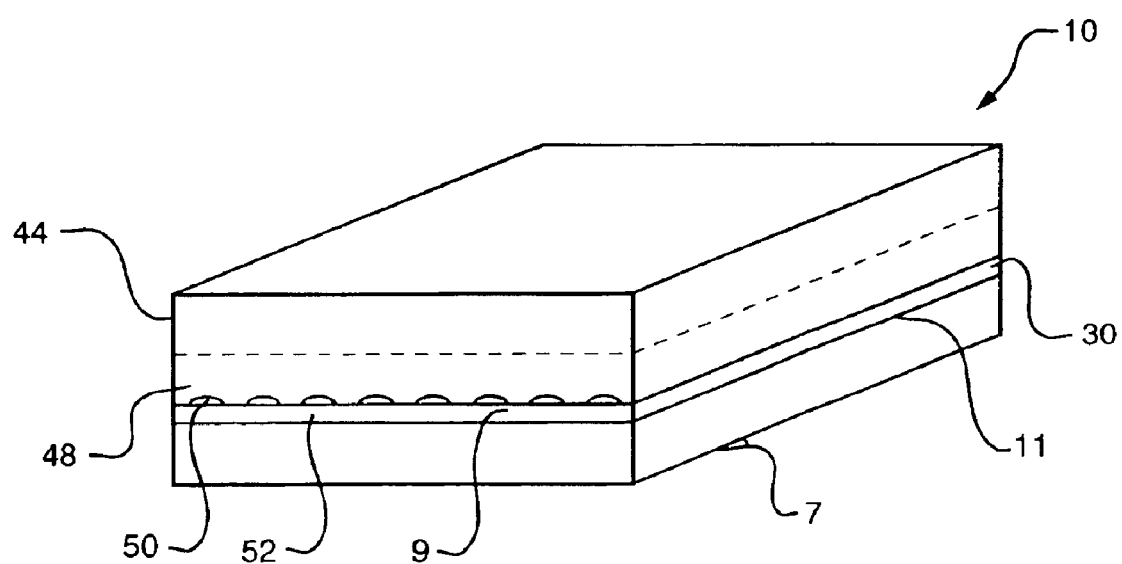
FIG. 3A is an isometric view of a membrane electrode assembly that includes the diffusion layer of the present invention and illustrates flow channels in the diffusion layer.
Figure 3B:
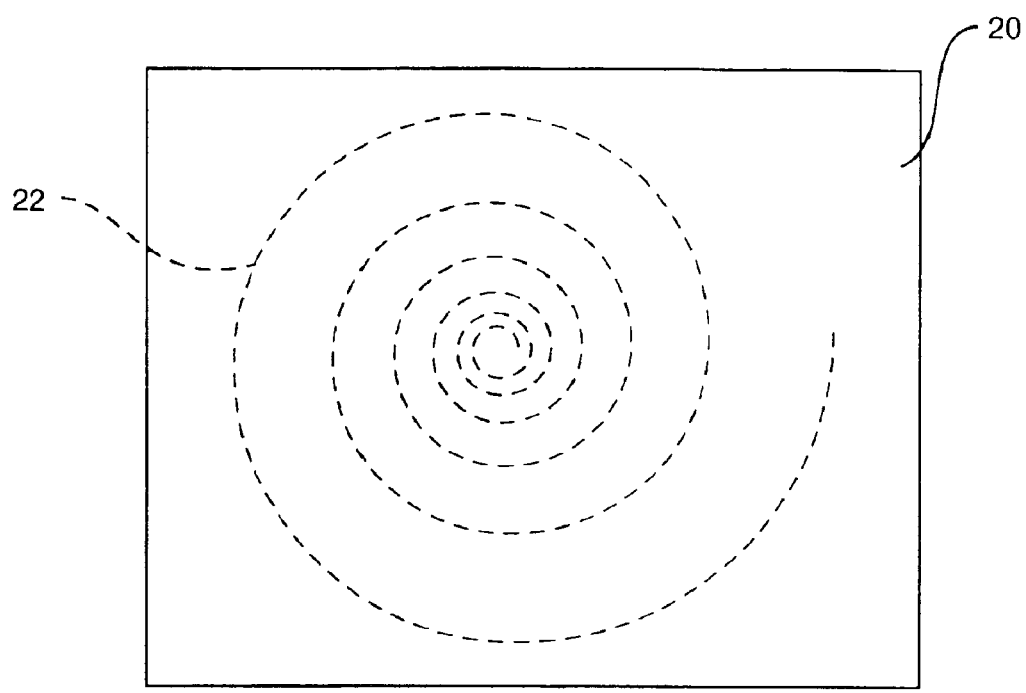
FIG. 3B is a top plan view of an embodiment of the diffusion layer of the present invention in which the flow channel is of a spiral shape.
Figure 3C:
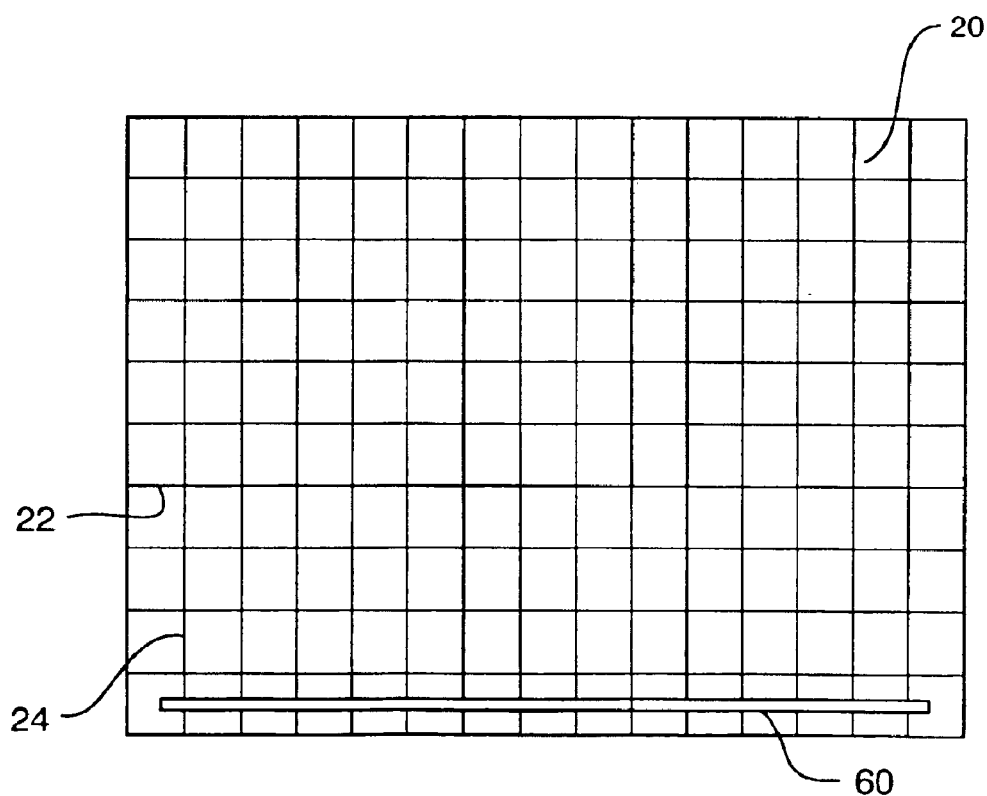
FIG. 3C is a top plan view of an embodiment of the diffusion layer of the present invention in which the flow channel is of a lattice pattern.

In accordance with one aspect of the present invention, the diffusion layer is embossed with a pattern, as illustrated with greater detail with reference to FIGS. 3A–3C. More specifically, the cathode diffusion layer 10 has embossed therein flow channels, which create a preferential flow path upon which water (or a liquid containing water, but which may also include a fuel solution) will travel away from the cathode face 11 of the membrane 7. Potential paths include but are not limited to those shown in the isometric view of FIG. 3A, the flow channels 50 and 52, for example, allow the water to flow away from the center of the membrane and consequently the fluids may be collected and recirculated, or eliminated from the system. As shown in FIG. 3B, the flow channel can be in a spiral pattern 22. As shown in FIG. 3C, a top plan view, the flow channels can be of a lattice layout having substantially linear portions, such as flow channel portions 22 and 24. These embossments will create a preferential liquid flow path to direct fluids as desired in the cell, and in one exemplary embodiment, will direct liquid water away the cathode diffusion layer to prevent and resist flooding of the cathode and separation of the cathode components of the fuel cell. It should be understood that many other geometric patterns may be formed as flow channels in the diffusion layer, while remaining within the scope of the present invention.

While not limiting to the invention, the flow channels may also minimize buildup of pressure by allowing liquid that accumulates at the interface between the cathode catalyst and the cathode microporous backing layer 48, (also referred to herein as a microporous layer), an outlet, so that hydrostatic pressure that could be created by such liquid does not build up. Instead, in the presence of the embossed flow channels the liquid is removed by the small hydrostatic pressure build up.

In addition, the flow channels may also provide an outlet to release the water built to up from the cathodic reaction and the accompanying water transport through the membrane. Water generated in the active electrode area, where the hydrophobic microporous layer is in direct and intimate contact with the catalyst layer, will be pushed away from the active electrode area and into the flow channels by the hydyrostatic pressure generated by the capillary force of the hydrophobic microporus layer. It thus opens the one-way transportation of oxygen from the air to the cathode catalyst layer without the egress flow of water encountered with a non-improved backing. Without water accumulation between the cathode catalyst layer and microporous layer or between the catalyst layer and membrane by using the improved cathode backing, the risk of cell component delamination may be eliminated. The hydrostatic pressure that drives water into the channels formed in the microporous layer may also be used to collect and direct the water from the cathodic reaction from the cathode compartment to the anode compartment passively, thus minimizing excessive water loss from the cathode. As a result, a higher power pack energy density can be achieved by carrying more methanol and less water as the fuel mixture.

The flow channels direct the water either to a collection point such as collection point 60 (FIG. 3C) or it may be eliminated into the ambient environment, or it may be returned to the anode side of the cell or of another cell as shown in FIG. 1. Those skilled in the art will recognize that the invention may also be used where a stack or other assembly containing more than one fuel cell is connected.

The pattern on the diffusion layer can be formed not only by embossing, but by other mechanical means that are appropriate in the particular application in which the invention is being employed such as milling or casting the microporous layer to form the flow channel pattern into the component in accordance with the present invention. The milled or cast layer would then be bonded or otherwise attached to the substrate of the diffusion layer using methods known to those skilled in the art.

Figure 4A:
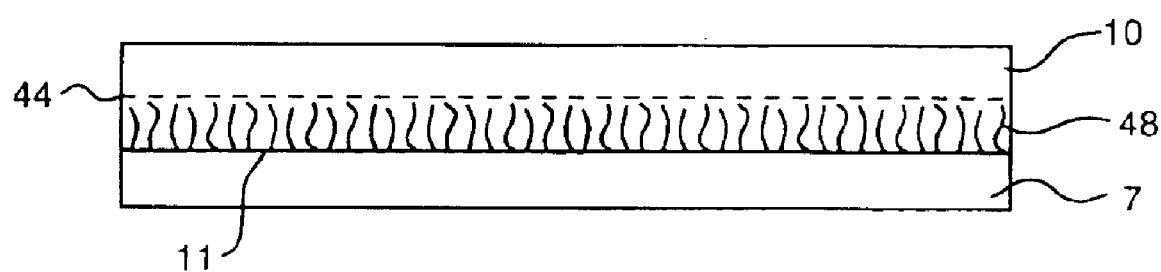
FIG. 4A is a cross section of a membrane electrode assembly which employs a diffusion layer constructed in accordance with another aspect of the invention in which cracks are formed in the microporous layer.
Figure 4B:
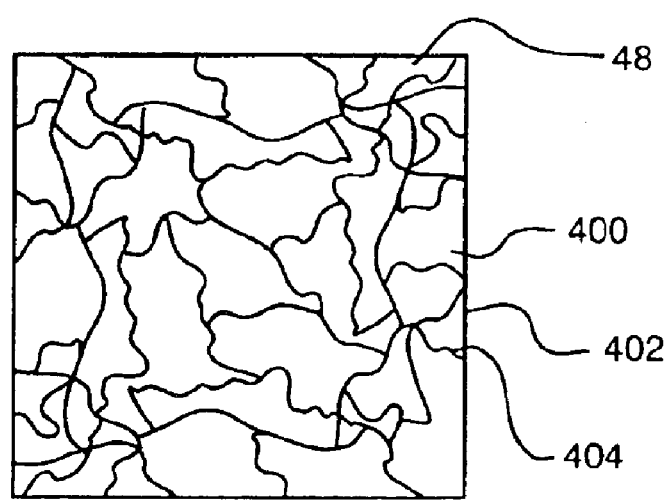
FIG. 4B is a top plan view of the embodiment of FIG. 4A.

Another aspect of the invention will be described with reference to FIGS. 4A and 4B. More specifically, in accordance with yet a further aspect of the invention, the preferential path is established by applying a thicker wet mixture containing Teflon and high surface area carbon particles, to the carbon cloth or carbon paper than is typically applied. After drying, then sintering at the glass transition temperature of the Teflon, the face of the porous coating layer cracks, forming a mud-cracked pattern 400 on the resulting microporous layer as shown in FIG. 4B. These mud cracking patterns can extend to the edges of the diffusion layer 402, 404, providing a pathway for water to be transported away from the active electrode area, to a point that is away from the active area of the PCM. The cracks would not extend into the membrane, but instead would extend from the surface of the microporous backing layer, partially towards the surface of the substrate.

A commercially available diffusion layer, such as ELAT, may also be modified by applying an additional layer of Teflon coating (or an additional layer of the material used to fabricate the microporous layer) to one side of said diffusion layer, then causing such layer to crack, using the same methods as set forth above. Whether the diffusion layer is fabricated from raw materials or is fabricated by modifying an existing diffusion layer, the cracks will, at most, penetrate the diffusion layer only to the depth of the substrate, as noted. The microporous layer opposite the face of the diffusion layer into which the preferential flow channels are established remains entirely intact, thus providing a diffusion layer with a preferential path without compromising the structural or conductive integrity of said diffusion layer. Alternate methods of cracking the microporous layer are within the scope of the invention. It should be understood that this embodiment may also be easier to manufacture, while still providing the benefits of removal of water from the active cathode area and protecting the PCM.

Performance may also be enhanced by adding hydrophobicity or hydrophilicity character to the appropriate materials in the cell which would also encourage and facilitate water removal from the cell or cathode and to encourage other byproducts to travel in such a direction so as to allow the energy generating reactions of the fuel cell system to proceed more efficiently to completion.

The method of the present invention includes the steps of making an improved diffusion layer by fabricating a substrate substantially of carbon, such as fabricating the substrate out of carbon paper or carbon cloth. The substrate is then treated by coating it with an electrically conductive layer, which is substantially hydrophobic, but permeable to gases, thus forming a microporous layer over the substrate. The microporous layer may be a composite of Teflon and high surface area carbon particles. This microporous layer is then embossed, by high pressure indentation techniques to form therein a pattern, thus, producing a preferential flow path, to direct water, or other liquids fluids, away from the membrane, and remove them from the active area of the cell, as desired. Instead of embossing, other mechanical techniques may be used such as milling and casting to form a layer having flow channels therein.

The method of the present invention for fabricating a liquid evolving, which may also be referred to herein as a liquid removing diffusion layer, may be further understood with reference to the accompanying example, which is illustrative only and not limiting to the invention.

EXAMPLE

A diffusion layer was fabricated by employing a substrate formed from a sheet of ELAT diffusion backing, commercially available from the E-Tek division of De Nora N.A., 39 Veronica Avenue, Somerset, N.J. 08873, measuring about 3.162 cm by 3.162 cm. This diffusion layer was comprised of a carbon cloth substrate with a microporous layer comprised of Teflon-bonded high surface area carbon particles. A lattice like pattern was embossed into the diffusion layer using pressure of 10,000 pounds per square inch, the pattern extending to the edges of the diffusion layer. The embossed diffusion layer was then placed in intimate contact with a catalyst coated membrane for use in the membrane electrode assembly of a direct methanol fuel cell.

The microporous layer tends to form a hydrophobic barrier adjacent the catalyst coated PCM, however, water can still build up near the cathode face of the fuel cell. The embossment in the cathode diffusion layer causes such water to travel along the preferential flow paths and be removed from the cathode, thus reducing the risk of cathode flooding which could limit the flow of oxygen to the cathode face, and limiting cell performance. It should be understood by those skilled in the art that the diffusion layer of the present invention allows gaseous reactants to reach the membrane while removing liquid byproducts from the membrane. The diffusion layer, on the cathode side, allows oxygen to diffuse through the microporous layer to the cathode catalyst layer, while the water produced in the cathode half reaction as well as water crossing through the membrane is directed away from the membrane. In addition, the diffusion layer of the present invention protects the cathode side of the membrane by reducing hydrostatic pressure that can otherwise cause delaminating problems.

It should be understood that the diffusion layer of the present invention assists in prevention of cathode flooding without the application of external force or energy. More specifically, the present invention provides a method of water removal that does not require active drying of the cathode layer.

Thus, it should be understood that the diffusion layer of the present invention provides many advantages for use with a low temperature direct oxidation fuel cell, where water tends to build up at the cathode catalyst and is required to be collected and redirected to maintain water balance. While we have described the diffusion layer with respect to the cathode, there may also be instances in which a patterned diffusion layer that includes preferential flow paths may be advantageously employed in the anode chamber of the fuel cell, while remaining within the scope of the present invention.

The foregoing description has been directed to specific embodiments of the invention. It will be apparent however that other variations and modifications may be made to the described embodiments with the attainment of some or all of the advantages of such. Therefore, it is the object of the appended claims to cover all such variations and modifications as come within the true spirit and scope of the invention.

What is claimed is:

1. A diffusion layer for a direct oxidation fuel cell, the fuel cell having a protonically conductive membrane, comprising:

a substrate comprised substantially of carbon, said substrate facilitating the transport of reactants towards a catalyst in intimate contact with said protonically conductive membrane and being coated with an electrically conductive layer that forms a microporous layer on said substrate, said microporous layer having indented channels formed therein, providing preferential flow paths to cause fluids to travel in predetermined directions in the fuel cell and to improve a distribution of the reactant to the catalytic layer.

2. The diffusion layer as defined in claim 1 wherein a catalyst has been applied to at least one side of the membrane of the fuel cell.

3. The diffusion layer as defined in claim 2 wherein said catalyst is applied to both sides of the membrane.

4. The diffusion layer as defined in claim 1 wherein said fluid is substantially water, and said indented channels are formed such that fluid is directed away from the membrane.

5. The diffusion layer as defined in claim 1 wherein said substrate is comprised substantially of carbon cloth.

6. The diffusion layer as defined in claim 1 wherein said substrate is comprised of at least one sheet of carbon paper.

7. The diffusion layer as defined in claim 6 wherein said substrate is comprised of a plurality of sheets of carbon paper.

8. The diffusion layer as defined in claim 1 wherein said electrically conductive layer is substantially hydrophobic.

9. The diffusion layer as defined in claim 8 wherein said electrically conductive layer includes polytetrafluoroethylene and high surface area carbon particles.

10. The diffusion layer as defined in claim 1 wherein said substrate is placed in intimate contact with said protonically conductive membrane.

11. The diffusion layer as defined in claim 1 wherein said indented channels are formed in a spiral pattern.

12. The diffusion layer as defined in claim 1 wherein said indented channels are formed in a lattice pattern.

13. The diffusion layer as defined in claim 1 wherein said indented channels are formed in such a geometric pattern as to draw fluids away from an active electrode area of the membrane.

14. A membrane electrode assembly comprising:
   a protonically conductive, electronically non-conductive membrane;
   at least one diffusion layer comprising a carbon substrate being coated thereon with an electrically conductive layer that forms a miroporous layer which includes indented channels formed therein, providing preferential flow paths to cause fluids to travel in predetermined directions in the assembly thereby providing a path through which reactants and byproducts may be preferentially transported to direct said reactants and byproducts in predetermined directions in said assembly and to improve a distribution of the reactant to the catalytic layer; and
   a catalyst disposed on said membrane and catalyst forming an active area of said assembly.

15. The membrane electrode assembly as defined in claim 14 wherein said catalyst is applied to at least one surface of the membrane.

16. The membrane electrode assembly as defined in claim 15 wherein said catalyst is applied to both surfaces of the membrane.

17. The membrane electrode assembly as defined in claim 14 including a plurality of diffusion layers and wherein at least one said diffusion layer is substantially hydrophobic.

18. The membrane electrode assembly as defined in claim 14 further comprising a membrane to which a catalyst has been applied is disposed between two diffusion layers, at least one of which diffusion layer provides said preferential flow path to direct fluids away from said active area of said assembly.

19. The membrane electrode assembly as defined in claim 14 wherein said membrane is comprised substantially of polyperfluorosulfonic acid.

20. The membrane electrode assembly as defined in claim 14 wherein said membrane is comprised substantially of a cation exchange membrane based on perflouorocarbon polymers with side chain termini of perfluorosulfonic acid groups.

21. The membrane electrode assembly as defined in claim 14 wherein the catalyst applied to at least one surface of the membrane contains platinum.

22. The membrane electrode assembly as defined in claim 21 wherein the catalyst applied to at least one surface of the membrane also contains ruthenium.

23. A direct oxidation fuel cell, comprising:
   (A) a membrane electrode assembly, including:
      (i) a protonically conductive, electronically non-conductive membrane electrolyte, having an anode face and an opposing cathode face; and
      (ii) a catalyst coating disposed on at least one of said anode face and cathode face, whereby electricity-generating reactions occur upon introduction of fuel solution from an associated fuel source, including anodic conversion of said fuel solution into carbon dioxide, protons and electrons, and cathodic combination of protons, electrons and oxygen from an associated source of oxygen, producing water;
   (B) an anodic diffusion layer disposed in intimate contact with said anode face of said membrane electrode assembly which allows said associated fuel mixture to pass through to said anode face as fuel is consumed at said anode, and which also allows anodically-generated $CO_2$ to be transported away from the anode face of the membrane;
   (C) a cathodic diffusion layer disposed in intimate contact with said cathode face of said membrane electrode assembly and which allows oxygen to pass through to said cathode face of said membrane electrode assembly, which cathode diffusion layer is comprised of a carbon-containing substrate and a microporous layer having channels formed therein to provide preferential flow paths such that reactants and byproducts in said fuel cell travel in predetermined directions along said channels and to improve a distribution of the reactant to the catalytic layer; and
   (D) means for collecting electric current generated in said electricity-generating reactions to provide said electric current to a load.

24. The direct oxidation fuel cell as defined in claim 23 wherein said substrate of said cathode diffusion layer is comprised substantially of carbon cloth.

25. The direct oxidation fuel cell as defined in claim 23 wherein said substrate of said cathode diffusion layer is comprised substantially of carbon paper.

26. A direct oxidation fuel cell system comprising:
   (A) a direct oxidation fuel cell including:
      (i) a membrane electrode assembly, including:
         a.) a protonically conductive, electronically non-conductive membrane electrolyte, having an anode face and an opposing cathode face; and
         b.) a catalyst coating disposed on at least one of said anode face and said cathode face, whereby electricity-generating reactions occur upon introduction of fuel solution from an associated fuel source, including anodic conversion of said fuel solution into carbon dioxide, protons and electrons, and cathodic combination of protons, electrons and oxygen from an associated source of oxygen, producing water;
      (ii) an anodic diffusion layer disposed in intimate contact with said anode face of said membrane electrode assembly which allows said associated fuel mixture to pass through to said anode face as fuel is consumed at said anode, and also allows anodically-generated $CO_2$ to be transported from the anode face of the membrane;
      (iii) a cathodic diffusion layer disposed in intimate contact with said cathode face of said membrane electrode assembly which allows oxygen to pass through to said cathode face of said membrane electrode assembly, and which cathodic diffusion layer is comprised of a carbon-containing substrate and a microporous layer having channels formed therein to provide preferential flow paths such that reactants and byproducts in said fuel cell travel in predetermined directions along said channels and to improve a distribution of the reactant to the catalytic layer; and (iv) means for collecting electric current generated in said electricity-generating reactions to provide said electric current to a load;

(B) a fuel source;

(C) fuel container and delivery assembly coupled between said fuel source and said direct oxidation fuel cell;

(D) means for removing reactants from the fuel cell;

(E) means for removing byproducts from the membrane electrode assembly; and (F) an electrical coupling means for connecting the fuel cell with an external device to which is it providing power.

27. The direct oxidation fuel cell system as defined in claim 26 further comprising a coupling between an anode chamber and a cathode chamber of said fuel cell, by which water collected from the cathode face of the membrane is recirculated to the anode chamber of the fuel cell.

28. The direct oxidation fuel cell system as defined in claim 27 further comprising means for mixing water recirculated from said cathode face of said membrane with a fuel substance and means for introducing a fuel and water mixture to the anode face of the membrane electrode assembly.

29. The diffusion layer as defined in claim 1 wherein said microporous layer is substantially comprised of a material that has been allowed to form cracks extending substantially to the edges of the diffusion layer thereby providing a pathway for fluid to be transported away from the active electrode area.

30. The diffusion layer as defined in claim 1 wherein said substrate and microporous layer are substantially comprised of materials selectively chosen such that a fuel substance can pass through said substrate, while carbon dioxide is directed through said preferential flow paths to be released or directed to another portion of said fuel cell.

* * * * *